(12) United States Patent
Bauer et al.

(10) Patent No.: US 8,523,190 B2
(45) Date of Patent: Sep. 3, 2013

(54) APPARATUS TO SECURE A CYLINDRICAL OBJECT FOR LASER PROCESSING

(75) Inventors: Wolfgang Bauer, Germering (DE); Gunther Friedmann, Ubersee (DE)

(73) Assignee: Carl Baasel Lasertechnik GmbH & Co, Starnberg (DE)

( * ) Notice: Subject to any disclaimer, the term of this patent is extended or adjusted under 35 U.S.C. 154(b) by 1161 days.

(21) Appl. No.: 12/082,292

(22) Filed: Apr. 10, 2008

(65) Prior Publication Data
US 2008/0284115 A1 Nov. 20, 2008

(30) Foreign Application Priority Data
Apr. 10, 2007 (DE) .......................... 10 2007 017 073

(51) Int. Cl.
*B23B 31/36* (2006.01)
(52) U.S. Cl.
USPC ............... 279/5; 279/110; 279/114; 279/123; 279/901
(58) Field of Classification Search
USPC ................ 279/5, 110, 114, 123, 901; 483/20
IPC ....................................................... B23B 31/36
See application file for complete search history.

(56) References Cited

U.S. PATENT DOCUMENTS

| 302,726 A | * | 7/1884 | Hand | 451/375 |
|---|---|---|---|---|
| 2,502,260 A | * | 3/1950 | Hunziker | 279/5 |
| 2,621,937 A | * | 12/1952 | Hunziker | 279/5 |
| 2,974,367 A | * | 3/1961 | Doering et al. | 425/392 |
| 3,617,046 A | | 11/1971 | Sotonyi | |
| 3,667,634 A | * | 6/1972 | Potterat | 414/433 |
| 3,887,202 A | * | 6/1975 | Zapart | 279/5 |
| 4,026,566 A | * | 5/1977 | Rohm | 279/121 |
| 4,222,577 A | * | 9/1980 | Giffin | 279/114 |
| 4,255,077 A | | 3/1981 | Smith | |
| 4,353,561 A | * | 10/1982 | Peterson | 279/123 |
| 4,401,308 A | * | 8/1983 | Sakaguchi et al. | 279/114 |
| 4,550,922 A | * | 11/1985 | Hall et al. | 279/119 |
| 4,582,331 A | * | 4/1986 | Rohm | 279/4.11 |
| 4,647,051 A | * | 3/1987 | Stone et al. | 279/2.04 |
| 4,821,393 A | | 4/1989 | Spigarelli | |
| 5,129,662 A | * | 7/1992 | Kempken | 279/123 |
| 5,174,586 A | * | 12/1992 | Saeda et al. | 279/5 |
| 5,224,716 A | * | 7/1993 | Saeda et al. | 279/5 |
| 5,556,085 A | * | 9/1996 | Cyr | 269/75 |
| 6,354,606 B1 | * | 3/2002 | Finn, III | 279/110 |
| 7,637,856 B2 | * | 12/2009 | Kawai et al. | 483/20 |
| 7,674,217 B2 | * | 3/2010 | Kawai | 483/20 |
| 2006/0021208 A1 | * | 2/2006 | Pfau et al. | 29/447 |
| 2006/0157942 A1 | * | 7/2006 | Ferrari et al. | 279/114 |

FOREIGN PATENT DOCUMENTS

| JP | 61038791 | | 2/1986 |
|---|---|---|---|
| JP | 61038792 | | 2/1986 |
| JP | 05253711 A | * | 10/1993 |
| JP | 2004338024 A | | 12/2004 |

* cited by examiner

*Primary Examiner* — Eric A Gates
(74) *Attorney, Agent, or Firm* — Fulbright & Jaworski LLP

(57) ABSTRACT

A device for holding an essentially cylindrical work piece (22), in particular a jewelry ring, for machining with a laser beam (L) has at least one chuck (20) that is supported so that it is able to rotate around a rotation axis (18) and that is provided for centrally holding the work piece (22) by means of first clamping elements (30), which automatically fix the work piece (22) in position through the exertion of a spring force.

11 Claims, 8 Drawing Sheets

APPARATUS TO SECURE A CYLINDRICAL OBJECT FOR LASER PROCESSING

RELATED APPLICATION

Figure 1:
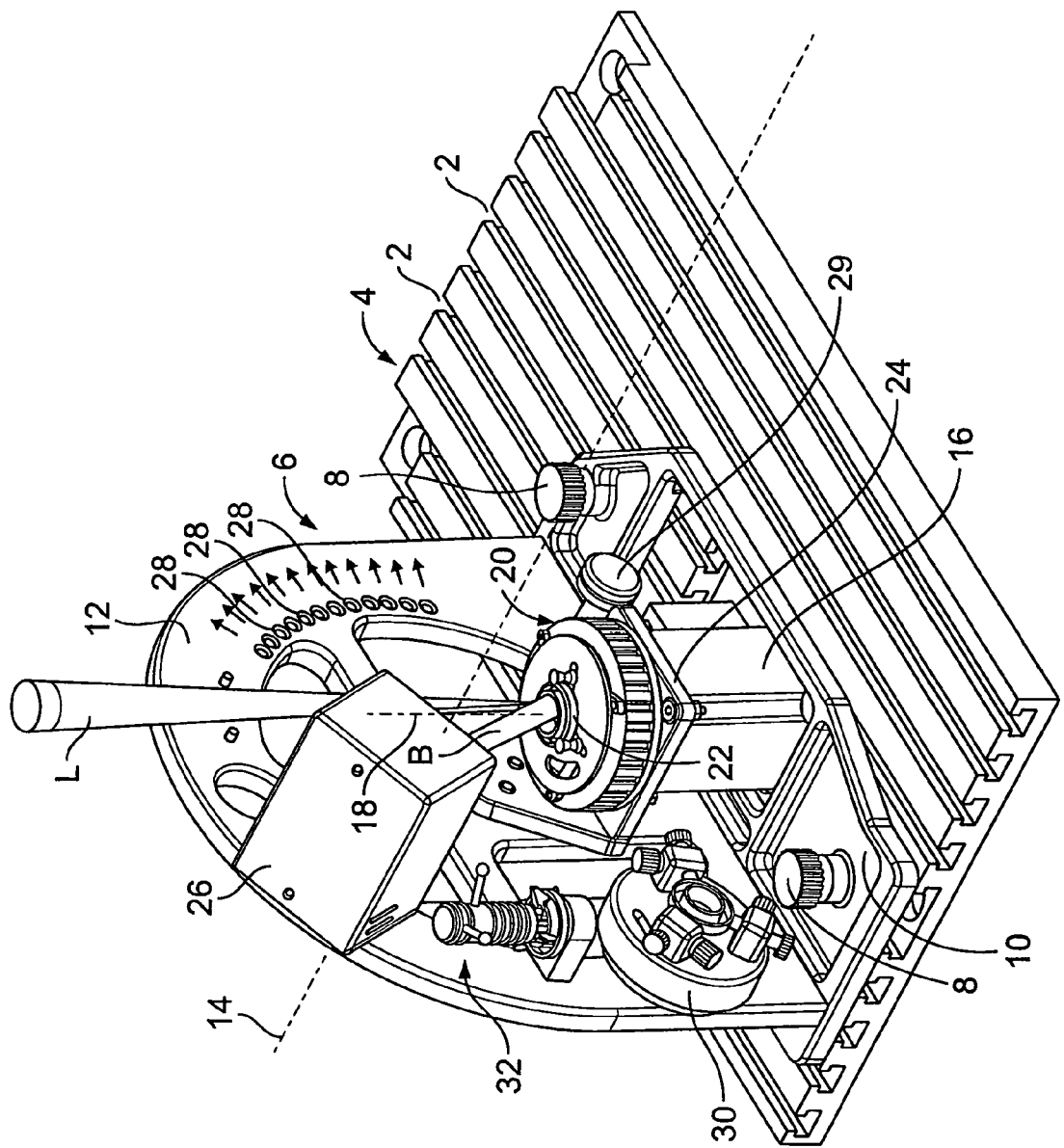

This application claims benefit from German Patent Application No. 10 2007 017 073.6 filed Apr. 10, 2007, incorporated by reference in its entirety.

The invention relates to a device for holding an essentially cylindrical work piece, in particular a jewelry ring, for machining with a laser beam.

When laser machining a cylindrical work piece, in particular a jewelry ring, it is customary in the prior art for a device, which is adapted to the respective concrete intended use, to be built into the laser system and to be adjusted there. Depending on the intended use, for example internal gravure or external gravure of a jewelry ring or other similarly shaped work pieces, it then becomes necessary to replace or reequip the entire device. The conversion requires a large amount of time, which significantly exceeds the actual machining time, i.e. the time in which the work piece or jewelry ring is machined with the laser beam. Furthermore, in the known devices, the holding is carried out with the aid of mechanical clamping devices that are designed to withstand powerful machining forces and therefore if improperly or carelessly used, can exert forces on sensitive work pieces, causing deformation of the latter.

The object of the present invention, therefore, is to create a device for holding an essentially cylindrical work piece, in particular a jewelry ring, for machining with a laser beam, which largely avoids an inadvertent damage to a sensitive work piece.

This object is attained according to the invention by means of the defining characteristics of claim 1. Since clamping elements are provided that automatically fix the work piece in position through the exertion of a spring force, this avoids an inadvertent exertion of excessive force on the work piece of the kind that can occur, for example, with a clamping device that is manually adjustable by means of levers or screws.

The invention is based on the consideration that the machining of a work piece with a laser beam occurs with practically no exertion of force so that for the laser machining, it is sufficient for the work piece to be fixed in the machining position with moderate holding forces. Using spring-loaded clamping elements, which automatically fix the work piece in position by exerting a spring force, avoids an undesirable, excessive exertion of force when clamping the work piece. To accomplish this, the clamping elements need only be brought directly or indirectly with the aid of mechanical adjusting elements into a position that permits the work piece to be placed into the holding position on the chuck. When the clamping elements are released, the action of the spring force causes them to automatically come to rest against the work piece and fix it in the machining position without the exertion of additional external forces on the work piece except for the spring force that is structurally predetermined and adapted to the work piece.

If the chuck is interchangeably affixed to a shaft of a rotary drive unit situated on a support, this permits a particularly flexible machining of differently shaped work pieces.

In another advantageous embodiment of the invention, the rotary drive unit is supported on the support so that it can pivot around a pivot axis extending perpendicular to the shaft. This increases the flexibility in the machining of the work piece.

If the rotary drive unit can also be locked in different detent positions on the support that are associated with different pivot positions, then it is possible to reproducibly set different machining positions without additional adjustment effort.

Other advantageous embodiments of the invention are disclosed in the remaining dependent claims.

The invention will be explained in greater detail in conjunction with the exemplary embodiment shown in the drawings.

Figure 2:
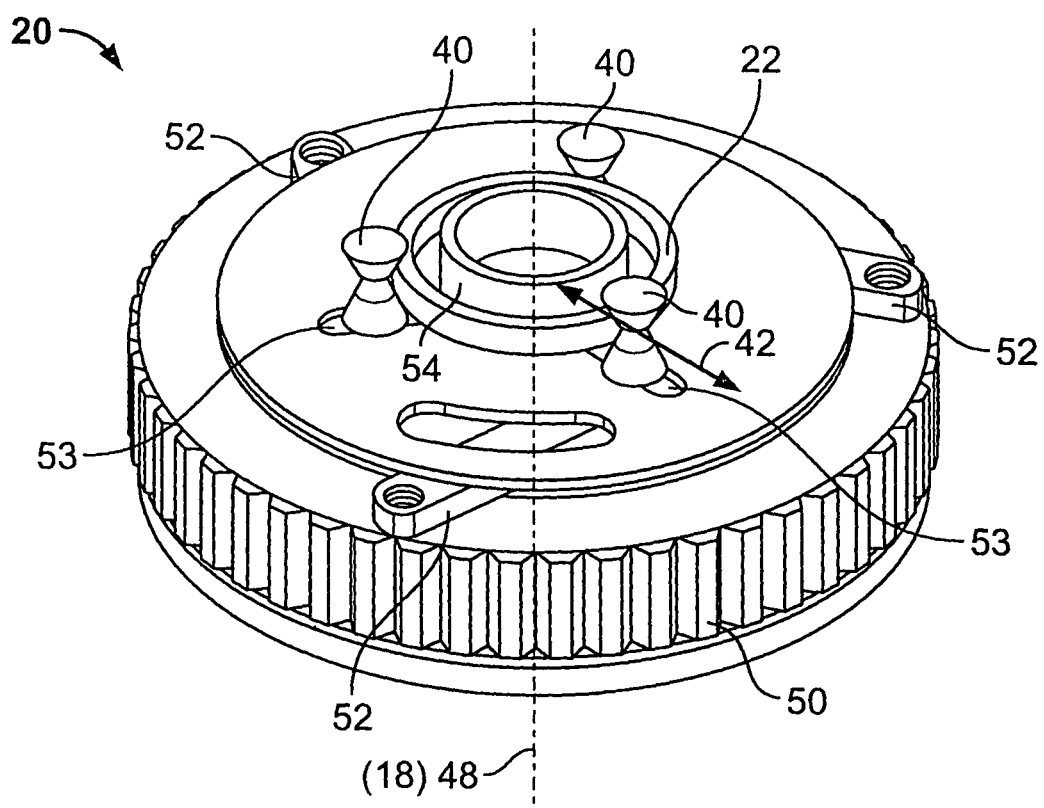
Figure 3:
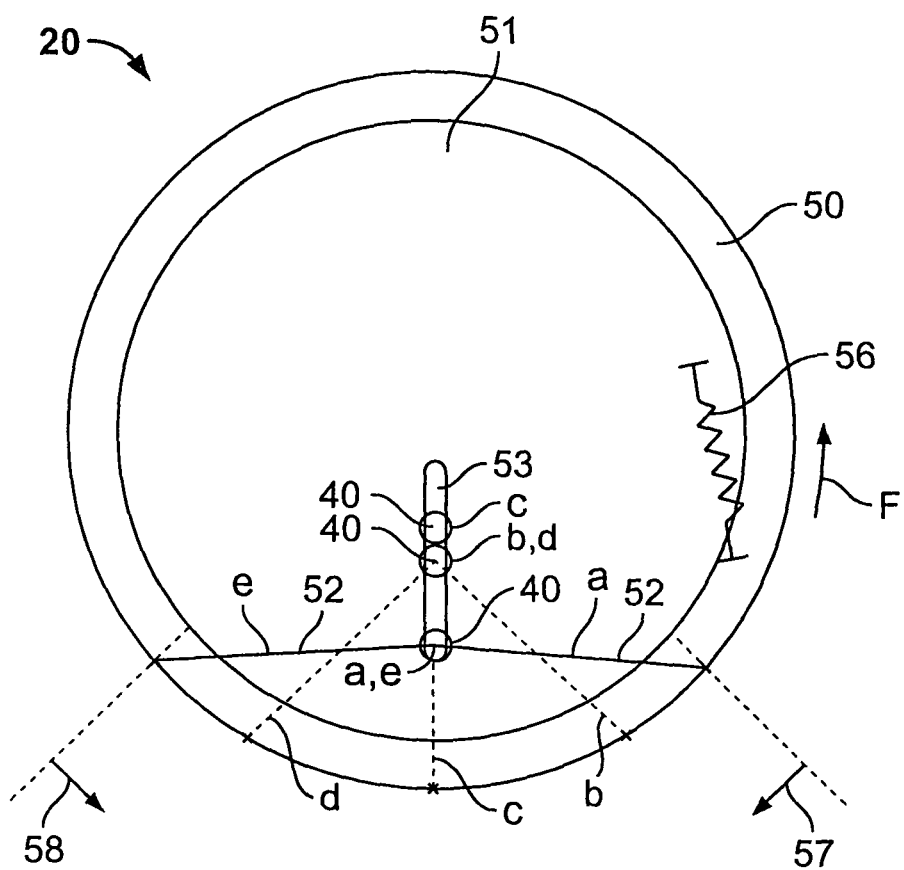
Figure 4:
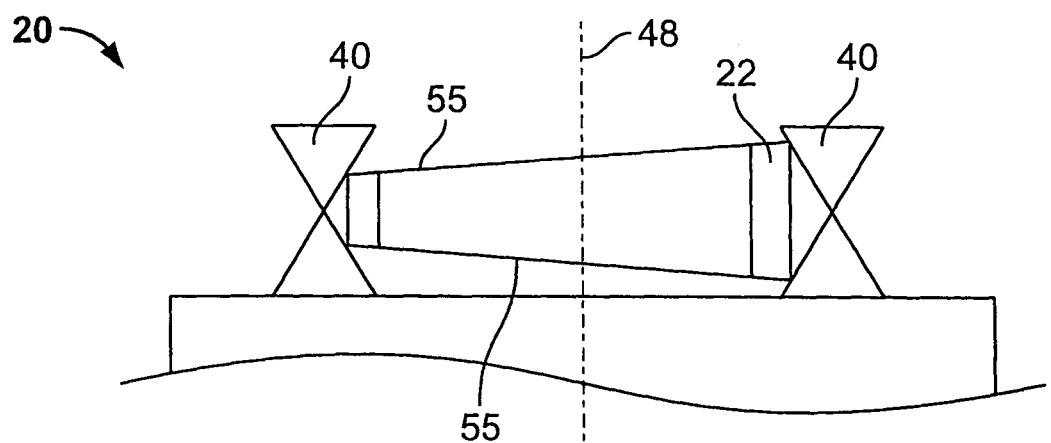
Figure 5:
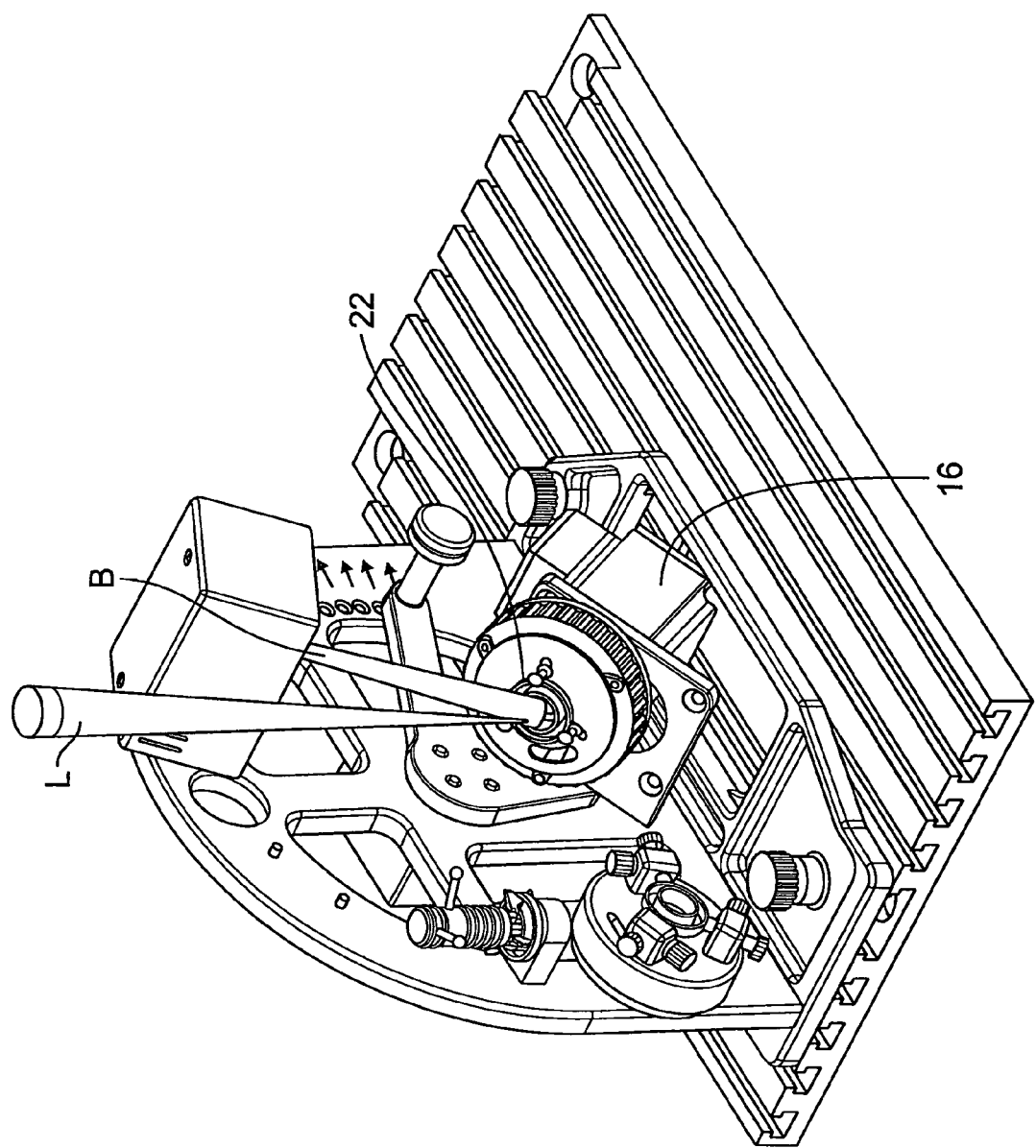
Figure 6:
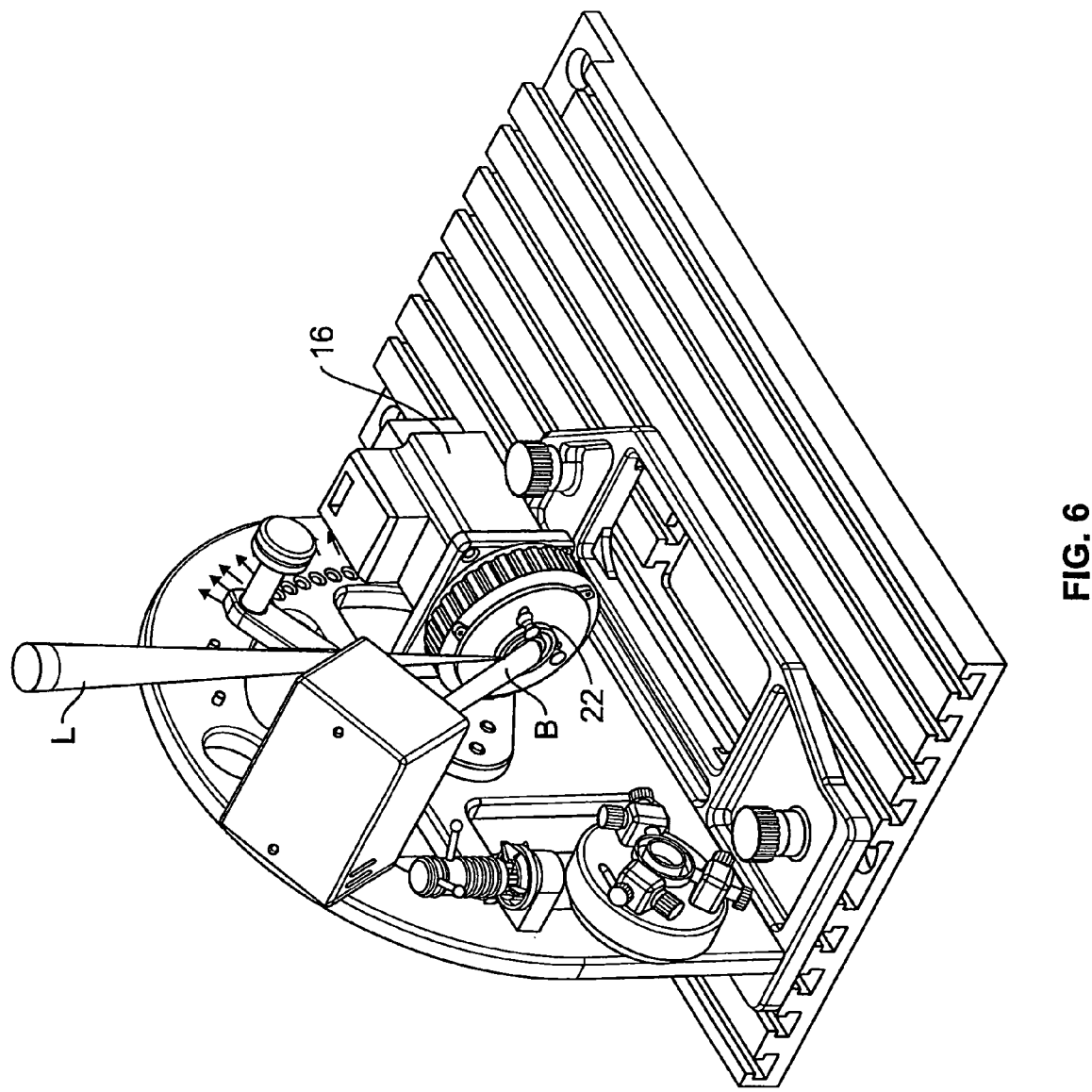
Figure 7:
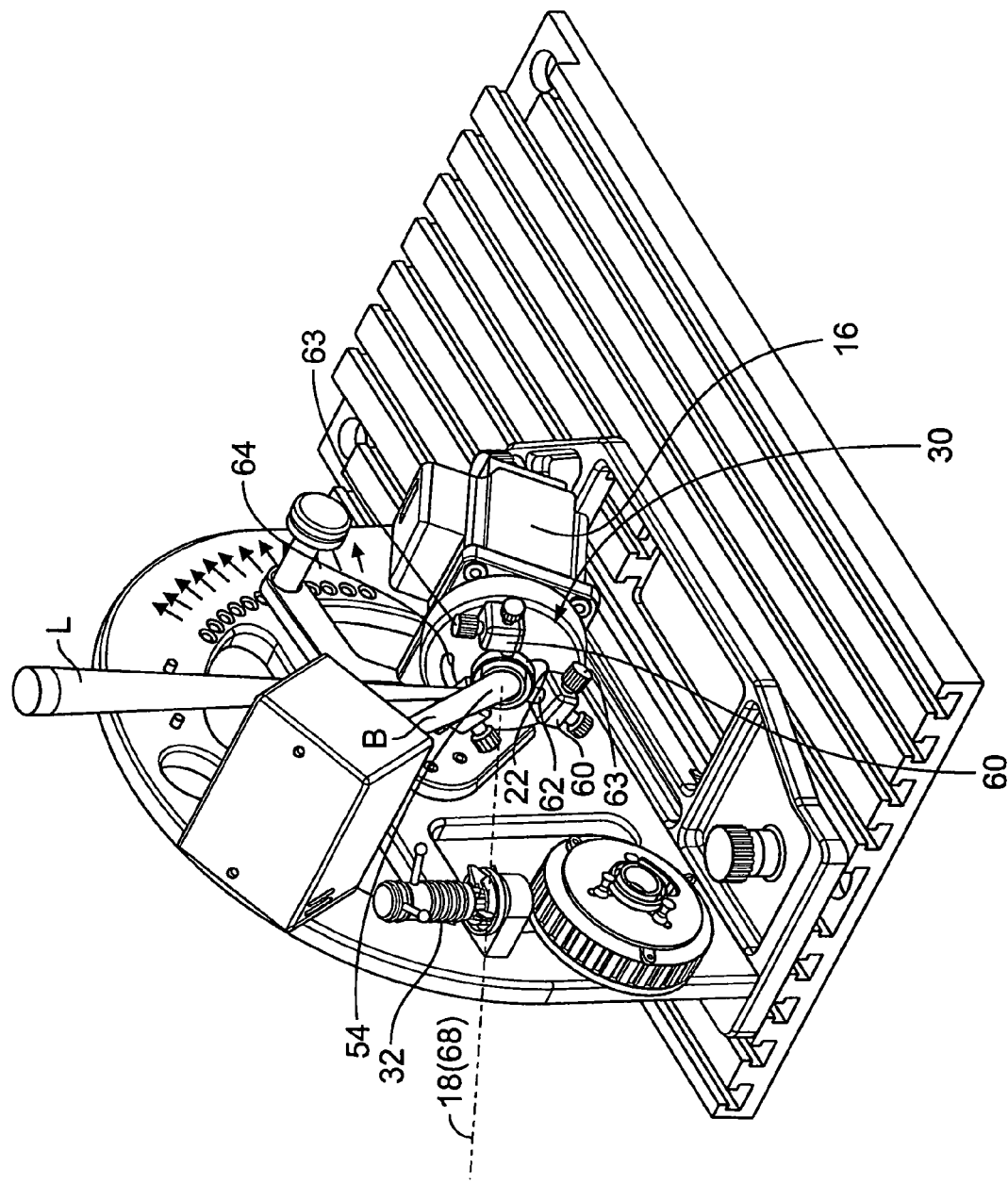
Figure 8:
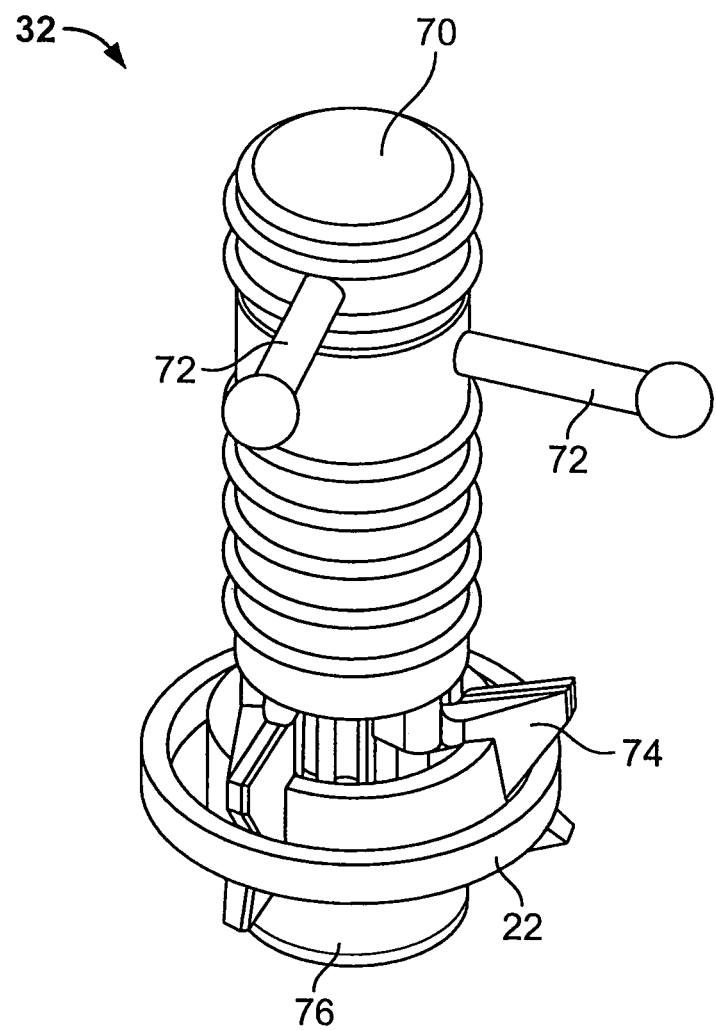

FIG. 1 is a perspective depiction of a device according to the invention,

FIG. 2 shows a first chuck according to the invention, likewise in a perspective depiction, FIG. 3 is a schematic depiction illustrating the function of the first chuck, FIG. 4 is a likewise schematic depiction illustrating the support of the work piece between the clamping elements of the first chuck, FIGS. 5 and 6 show the device according to the invention with the rotary drive unit in different pivot positions, FIG. 7 shows the device according to the invention with a second, alternative chuck in the working position, FIG. 8 is a perspective depiction of an auxiliary device for insertion of a hollow cylindrical work piece into the first or second clamping device.

According to FIG. 1, the device according to the invention has a mounting plate 4 provided with a plurality of longitudinal T-slots 2 onto which a support 6 is mounted with the aid of clamping screws 8 and positioning pins in a stationary fashion relative to a focused laser beam L that is produced by a laser device not shown in the drawing. The support 6 has a base plate 10 that rests on the mounting plate 4 and has a support plate 12 extending from it in perpendicular fashion on which a rotary drive unit 16 is supported so that it can pivot around a pivot axis 14 extending perpendicular to this support plate.

An interchangeably supported first chuck 20 is affixed to a shaft of the rotary drive unit 16 so that it is able to rotate around the rotary axis 18 of the shaft and an essentially cylindrical work piece 22; in the example, a hollow cylindrical work piece, e.g. a jewelry ring, is clamped centrally into this first chuck 20.

The rotary drive unit 16 is mounted in a holder 24 that is supported so that it can pivot around the pivot axis 14 on the support 6 so that it is possible to pivot the work piece 22 into different machining positions relative to the laser beam L.

A monitoring camera 26 is mounted on the arc-shaped support plate 12 and its field of view, indicated in the drawing in the form of a monitoring cone B, includes the machining zone, i.e. the focus of the laser beam L in order to thus permit a visual control of the machining process.

The support plate 12 has recesses 28 that are let into it at various angular positions and are engaged in detent fashion by a spring loaded releasable pin 29, which is supported on the holder 24 of the rotary drive unit 16, thus permitting the rotary drive unit 16 and therefore the first chuck 20 supported on it to be pivoted into various predetermined, indexed pivot- or detent positions and locked in place in them without requiring a precise adjustment for each one. In accordance with the different position of the machining location associated with the different angular positions, the laser beam L is positioned with the aid of a beam-guiding device that is also not shown in the drawings.

The monitoring camera 26 can be situated on the support plate 12 in various positions that on the one hand, do not hinder the path of the laser beam L and on the other hand, permit an optimal monitoring of the machining process.

In a receptacle provided on the support plate 12, there is a second chuck 30 that is structurally different from the first chuck 20. Depending on the work piece 22 to be machined, the first chuck 20 can be replaced with the second chuck 30. In a receptacle also provided on the support plate 12, there is an auxiliary device 32 that is used for inserting a hollow cylindrical work piece into the first or second chuck 20 or 30; the operation of this auxiliary device 32 will be explained in greater detail below.

According to FIG. 2, the first chuck 20 includes three clamping elements 40 that are embodied in the form of a double cone and are radially adjustable in relation to a clamping axis 48. The radial adjustability of the clamping elements 40 in relation to the clamping axis 48 is indicated by a double arrow 42. To this end, the clamping elements 40 on pivoting levers 52 are each guided in an opening or slot 53 let into a rigid disk 51. This pivot axis 48 coincides with the rotation axis 18 (FIG. 1) when the chuck 20 is affixed to the rotary drive unit 16 (FIG. 1).

The clamping chuck 20 has a knurled rotation ring 50 on which the pivoting levers 52 are supported so that they can pivot around a pivot axis extending parallel to the clamping axis 48. Depending on the rotation direction of the rotation ring 50, the first clamping elements 40 can be moved inward or outward by means of the pivoting levers 52. In the example shown in the drawing, a situation is shown in which the first clamping elements 40 are clamping an annular work piece 2 at its outer circumference by means of a spring force oriented toward the clamping axis 48. It is also possible, however, to use the first chuck 20 shown to clamp a hollow cylindrical work piece at its inner circumference, i.e. with an outward-directed spring force centered in relation to the clamping axis 48.

FIG. 3 shows the clamping mechanism in action in the first chuck 20 in a schematic depiction in which for the sake of clarity, only one of the three first clamping elements 40 is depicted. In a starting position a of the pivoting lever 52, the first clamping element 40 is situated at the outer end of the slot 53. This position is achieved by means of a spring element 56 that acts, for example, on the rotation ring 50 and is only illustrated schematically in the drawing in the form of a tension spring. This spring element 56 exerts a torque on the rotation ring 50 in a counterclockwise direction, i.e. a restoring force F acting counterclockwise in the circumference direction, and therefore exerts a force directed radially outward on the first clamping element 40. If the rotation ring 50 is then rotated in opposition to the action of the spring element 56, in the direction of the arrow 57 (clockwise), then the first clamping element 40 in the slot 53 moves radially toward the center into an intermediate position d. In this case, the first clamping element 40 is acted on by a radially outward-directed force produced by the spring element 56, thus making it possible to affix a hollow cylindrical work piece at its inner circumference. A further rotation of the rotation ring 50 in the direction of the arrow 57 beyond the central position c into an intermediate position d then causes a reversal of the force that the spring element 56 exerts on the first clamping element 40 by means of the rotation ring 50, causing the force to then act in a radially inward direction. Until it is rotated further into the end position e, therefore, when the rotation ring 40 is released, an inward-acting force is exerted on the work piece so that a hollow cylindrical or solid cylindrical work piece is clamped in position, counterclockwise in the direction of the arrow 58 back into the starting position a.

In order to fix the work piece in position, it is therefore only necessary to rotate the rotation ring 50 into an intermediate position (starting position) in which the first clamping elements 40 are situated either inside or outside the work piece. Depending on the starting position, when the rotation ring 50 is released, the first clamping elements either push radially outward (positions between a and c) or inward (positions between e and c) and automatically fix the work piece in position either at its inner circumference or at its outer circumference. The situation depicted in FIG. 2 corresponds approximately to the position d of the pivoting levers 52. This fixing occurs solely through the action of the spring element 56 with a holding force that is predetermined by this spring element 56 and the inner or outer diameter of the work piece and cannot be influenced by the user. This avoids deformation of filigree work pieces due to improper operation and the exertion of excessive clamping forces.

In lieu of the spring element 56 schematically depicted in the form of a tension spring in FIG. 3, it is fundamentally also possible to use other spring elements. Thus, for example, it is possible alternatively or in addition for the pivoting levers 52 to each be supported on the rotation ring 50 in a sprung fashion, for example, by means of a respective spiral spring and for these springs to act on the pivoting levers 52 directly with a return moment that acts around their pivot axis. It is essentially suitable to use any spring elements that exert a return torque directly or indirectly on the pivoting levers; the geometric arrangement of the pivoting levers 52 and slots 53 is preferably embodied so that the above-explained reversal of the force that this torque exerts on the first clamping elements 40 occurs within the rotation path of the rotation ring 50 between the starting position a and the end position.

FIG. 4 shows the operation of the first clamping elements 40 of the first chuck 20, which elements are embodied in the form of a double cone. This embodiment of the first clamping elements 40 and the resulting prismatic guidance assures that a cylindrical work piece 22 is always positioned centrally in relation to the clamping axis 48 regardless of its size in the direction of its cylinder axis and is therefore also positioned centrally in relation to the rotation axis 18 when in the working position. This is symbolically depicted in the drawings by means of a work piece 22 with end surfaces 55 extending obliquely in relation to each other.

FIGS. 5 and 6 show the device according to the invention in different working positions in which the rotary drive unit 16 is situated in different pivot positions. FIG. 5 shows a position in which it is possible to produce an internal engraving of an annular work piece 22. FIG. 6 shows a working position in which the work piece 22 is oriented with its cylinder axis perpendicular to the beam axis of the laser beam L so that the work piece 22 can be machined on the outer circumference.

According to FIG. 7, in lieu of the first chuck 20, which in this working position is situated in the receptacle provided on the support plate 12, the second chuck 30 is affixed to the rotary drive unit 16. The second chuck 30 has three second clamping elements 60, each of which has a clamping pin 62 that is supported in sliding fashion and can be adjusted in a plane extending perpendicular to the clamping axis 68; two of the second clamping elements 60 are supported in stationary fashion on the second chuck 30 so that the clamping pins 62 are oriented radially in relation to the clamping axis 68 and can be clamped radially against the work piece 22. To this end, the clamping pins 62 supported in sliding fashion are moved toward the work piece 22 and fixed in position with the aid of clamping screws 63.

One of these second clamping elements 60 is supported in sliding fashion in the circumference direction in a guide groove 64 extending in this circumference direction in order to thus make it possible to accommodate a work piece 22 that is not exactly cylindrically shaped.

It is also clear from FIGS. 2 and 7 that both the first and second chucks 20 and 30 have a cylindrical sleeve 54 that is situated centrally in relation to the clamping axis 48 or 68 and that serves as a guide for the central placement of the auxiliary device 32, which is shown in FIGS. 1, 5, 6, and 7, accommodates a hollow cylindrical work piece 22, and is explained in greater detail below. Such a sleeve 54 is only functional when machining hollow cylindrical work pieces 22 that are inserted into the first or second chuck 20 or 30 with the aid of the auxiliary device 32.

According to FIG. 8, the auxiliary device 32 has a cylindrical mandrel 70 on which three clamping jaws 74 are provided, which can be adjusted radially with the aid of two pivoting levers 72 and which likewise form a prismatic recess with which they centrally hold an annular, hollow cylindrical work piece 22 at its inner circumference. The mandrel 70 terminates in a cylindrical extension 76 whose outer circumference is adapted to the inner circumference of the sleeve 54 situated on the first and/or second chuck 20 or 30 so that the mandrel 70 can be placed centrally in the first or second chuck 20 or 30 and is secured in place so that the second clamping elements 60 fix the work piece in a position in which it is aligned centrally in relation to the clamping axis 48 or 68.

The invention claimed is:

1. A device for holding an essentially cylindrical work piece, for machining with a laser beam (L), having at least one chuck that is supported so that it is able to rotate around a rotation axis and that is provided for centrally holding the work piece by means of first clamping elements, which automatically fix the work piece in a central position through the exertion of a spring force exerted on the clamping elements by a spring element thereby pushing the clamping elements radially outward or inward after releasing the clamping elements from a starting position that permits the work piece to be placed on the chuck, wherein the work piece is fixed on the chuck solely through the action of the spring element.

2. The device as recited in claim 1, in which the first chuck is supported on a shaft of a rotary drive unit situated on a support.

3. The device as recited in claim 2, in which the rotary drive unit is supported on the support so that it is able to pivot around a pivot axis extending perpendicular to the shaft.

4. The device as recited in claim 3, in which it is possible to lock the rotary drive unit in detent positions on the support that are associated with different pivot positions.

5. The device as recited in claim 3, having a monitoring camera that has the capacity to be mounted in various positions on the support.

6. The device as recited in claim 2, in which it is possible to interchangeably affix the first chuck to the shaft of the rotary drive unit.

7. The device as recited in claim 1, in which the first chuck has three radially adjustable first clamping elements that are able to fix the work piece in position in the chuck through exertion of an inwardly or outwardly directed radial spring force.

8. The device as recited in claim 7, in which the first clamping elements are embodied in the form of double cones.

9. The device as recited in one of the preceding claims, having a second chuck that includes three second clamping elements, each of which is equipped with a clamping pin that is supported in sliding fashion and is adjustable in a plane extending perpendicular to the clamping axis, where two of the second clamping elements are supported in stationary fashion so that the axis of the clamping pins is oriented radially in relation to the clamping axis and one second clamping element is supported so that it is able to slide in the circumference direction around the clamping axis.

10. The device as recited in claim 9, in which the second chuck has a guide for centrally mounting an auxiliary device onto the second chuck and this auxiliary device has adjustable clamping jaws for centrally holding a hollow cylindrical work piece at its inner circumference.

11. A device for holding a jewelry ring, for machining with a laser beam (L), having at least one chuck that is supported so that it is able to rotate around a rotation axis and that is provided for centrally holding the work piece by means of first clamping elements, which automatically fix the work piece in a central position through the exertion of a spring force exerted on the clamping elements by a spring element thereby pushing the clamping elements radially outward or inward after releasing the clamping elements from a starting position that permits the work piece to be placed on the chuck, wherein the work piece is fixed on the chuck solely through the action of the spring element.

* * * * *